United States Patent [19]
Gunther et al.

[11] Patent Number: 5,161,676
[45] Date of Patent: Nov. 10, 1992

[54] ENDLESS BAND CONVEYOR

[75] Inventors: Roland Gunther, Wesel, Fed. Rep. of Germany; Jean M. Terriez, Montbonnot, France

[73] Assignee: Universite Joseph Fourier, Grenoble, France

[21] Appl. No.: 725,791

[22] Filed: Jul. 9, 1991

[30] Foreign Application Priority Data

Jul. 9, 1990 [FR] France ................. 90 08696

[51] Int. Cl.⁵ ........................................... B65G 15/08
[52] U.S. Cl. ................................... 198/819; 198/826; 198/83.3
[58] Field of Search ............... 198/819, 825, 826, 829, 198/841, 842, 833

[56] References Cited

U.S. PATENT DOCUMENTS

| | | |
|---|---|---|
| 1,530,707 | 3/1925 | Warner . |
| 1,559,772 | 11/1925 | Peale .................................. 198/819 |
| 2,712,378 | 7/1955 | Eggleston ........................... 198/842 |
| 4,378,875 | 4/1983 | Allan et al. ......................... 198/833 |
| 4,615,434 | 10/1986 | Lachmann ........................... 198/833 |

FOREIGN PATENT DOCUMENTS

| | | |
|---|---|---|
| 226080 | 6/1909 | Fed. Rep. of Germany . |
| 1938118 | 2/1971 | Fed. Rep. of Germany . |
| 2054507 | 2/1981 | United Kingdom . |

Primary Examiner—Joseph E. Valenza
Attorney, Agent, or Firm—Armstrong, Nikaido, Marmelstein, Kubovcik & Murray

[57] ABSTRACT

Endless band conveyor (2), the edges of which are equipped with endless cables. Each of the longitudinal edges (6, 7) of the endless band (2) is equipped with projecting catch elements (8) spaced in the longitudinal direction of the band and fastened to an endless cable (12, 14), and on each of the sides of the endless band and over at least some of its length the path of the endless cables is determined by pulleys (15, 16), thus making it possible to suspend the edges of the endless band (2).

13 Claims, 7 Drawing Sheets

ENDLESS BAND CONVEYOR

The present invention relates to the sector of endless band conveyors intended for transporting materials which are generally deposited continuously onto the upper strand of the band, especially in the vicinity of one of its ends, in order to be discharged by gravity at its other end.

Various types of endless band conveyors are known at the present time.

The band conveyors most frequently used have at their ends drums for the return of the endless band and possess a multiplicity of horizontal rollers supporting the upper strand of the endless band and some rollers supporting its lower strand. To prevent losses of materials and increase the quantity of materials transported, the abovementioned endless band conveyors have rollers of inclined axes which make it possible to raise the lateral parts of the upper strand of the endless band.

Also known are endless band conveyors, in which the longitudinal edges of the upper strand of the band are coupled in a line, the band then forming a longitudinal pouch or gutter. The transported materials are thus protected from the external environment and no loss of materials can occur. Many endless band conveyors of this type are known.

In particular an endless band conveyor is known the longitudinal edges of which are equipped with continuous sections, in which endless cables are inserted. In line, the lateral sections of the upper strand of the endless band are supported or kept coupled by means of two lines of lateral rollers arranged on either side of the coupled edges of the band.

Likewise an endless band conveyor is known which comprises a longitudinal carrier cable, on the upper part of which the edges of the upper strand of the band come to bear one on the other, these edges being equipped with mutually complementary grooves and ribs engaged one in the other and with flexible holding magnets. There are, moreover, rollers which come to bear on the superposed edges of the band in such a way as to keep them bearing against the carrier cable.

The abovementioned endless band conveyors can, furthermore, possess rollers making it possible to carry the central part of their upper strand.

The main disadvantages of the abovementioned endless band conveyors and cables are that they require an exact positioning of the longitudinal edges of the upper strand of the endless band, to allow them to be coupled, and that the deformations which the edges of the endless band experience bring about relatively rapid wear which prevents the endless bands from having a sufficiently long lifetime. Moreover, the abovementioned endless bands have high production costs.

The object of the present invention is to provide an endless band conveyor which, in particular, makes it possible, in comparison with known conveyors, to increase the lifetime of the endless band and to reduce its production cost and its operating and maintenance costs.

The endless band conveyor according to one subject of the invention, the longitudinal edges of which are equipped with projecting catch elements spaced in the longitudinal direction of the band, is such that the said catch elements are fastened to at least two endless cables and that, on each of the sides of the endless band and over at least some of its length, the path of the said endless cables is determined by supporting pulleys and reaction pulleys, on which the said cables bear respectively, generating a lever effect, thus making it possible to suspend the edges of the endless band.

According to the invention, each catch element preferably comprises two parts which are articulated on one another in the longitudinal direction of the band and of which one is fastened to the edge of the band and the other is fastened to the associated endless cable.

The endless band conveyor according to another subject of the invention, the edges of which are equipped with endless cables, is such that each longitudinal edge of the endless band is fixed to at least two endless cables and that, on each of the sides of the endless band and over at least some of its length, the path of the cables is determined by supporting pulleys and reaction pulleys, on which the said cables bear respectively, generating a lever effect, thus making it possible to suspend the edges of the endless band.

According to the invention, each longitudinal edge of the endless band can, furthermore, be fixed to a third endless cable.

In a preferred embodiment of the invention, each longitudinal edge of the endless band is fixed to the endless cables associated with it by means of projecting catch elements spaced in the longitudinal direction of this band.

According to the invention, each catch element preferably comprises two parts which are articulated on one another in the longitudinal direction of the band and of which one is fastened to the longitudinal edge of the band and the other is fastened to the associated endless cables.

The conveyor according to the invention can advantageously comprise supports, each carrying at least one supporting pulley and at least one reaction pulley which are associated with a longitudinal edge of the endless band.

Preferably, this supporting pulley and this reaction pulley are of parallel axes and are located on either side of the cables.

According to an advantageous arrangement of the invention, the said supporting pulleys and reaction pulleys are arranged in such a way that, over at least some of the length of the upper strand and/or of the lower strand of the endless band, the longitudinal edges of the latter are close to one another.

The conveyor according to the invention can also comprise, at its ends, pulleys for the return of the said cables.

The conveyor according to the invention can comprise, furthermore, at its ends, return members on which the endless band bears, and these return and bearing members can consist of a multiplicity of rollers.

The present invention will be understood better from a study of a band conveyor described by way of non-limiting example and illustrated in the drawing in which.

Figure 1:
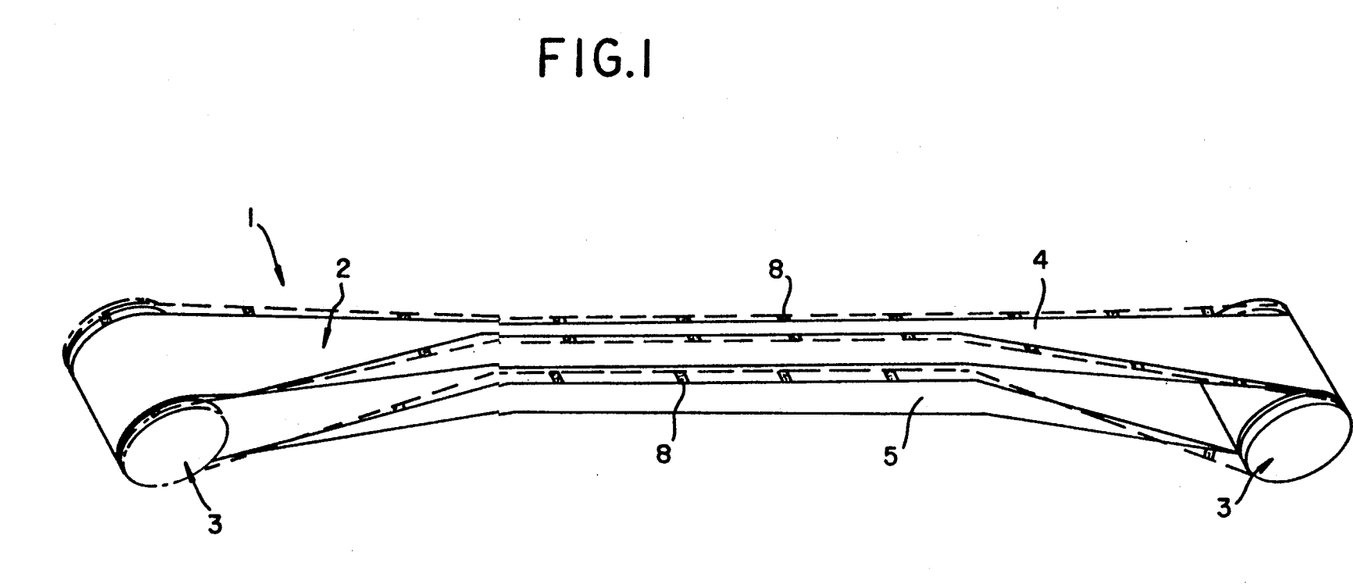
FIG. 1 shows a perspective view of an endless band of a conveyor according to the invention.

Referring to FIG. 1, it will be seen that the endless band conveyor, designated as a whole by the reference 1, comprises and endless band 2 of great length and, at its ends, members for the return of the endless band, designated as a whole by the reference 3, so that in line, that is to say between the opposite return members 3, the upper strand 4 and lower strand 5 of the endless band 2 are substantially straight and one above the other, the upper strand 4 being intended for the transport of materials.

Figure 2:
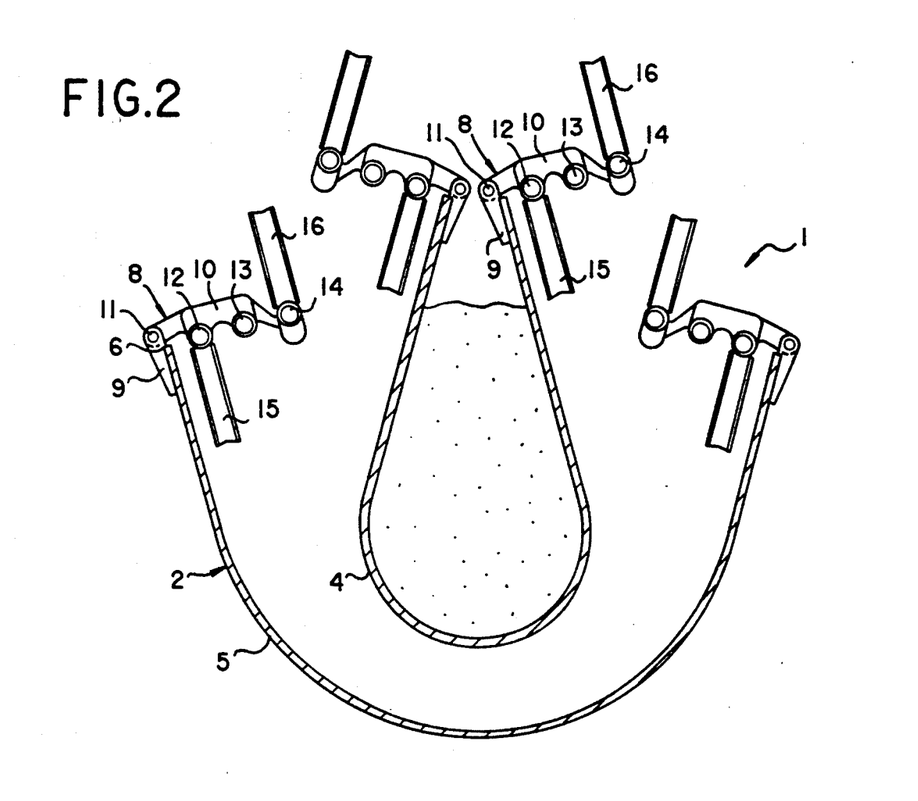
FIG. 2 shows a cross-section through the lateral part of the conveyor in its middle portion, without its supporting structure.
Figure 3:
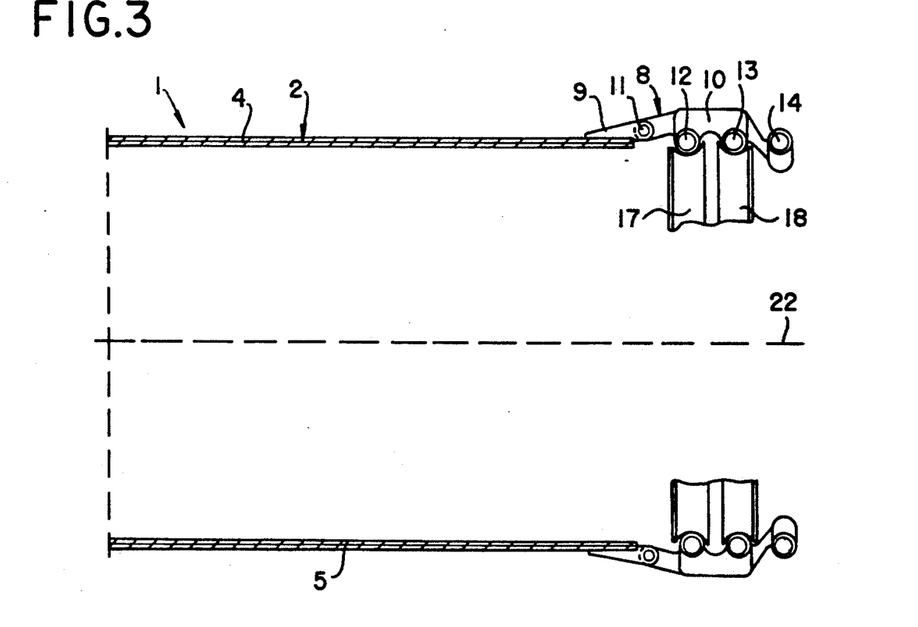
FIG. 3 shows a cross-section through the conveyor at one of its ends.
Figure 4:
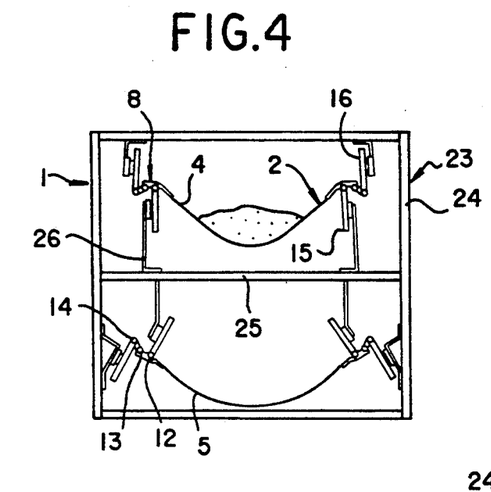
FIGS. 4 to 7 show cross-sections through supporting structures of the endless band of the conveyor at different points over its length.
Figure 5:
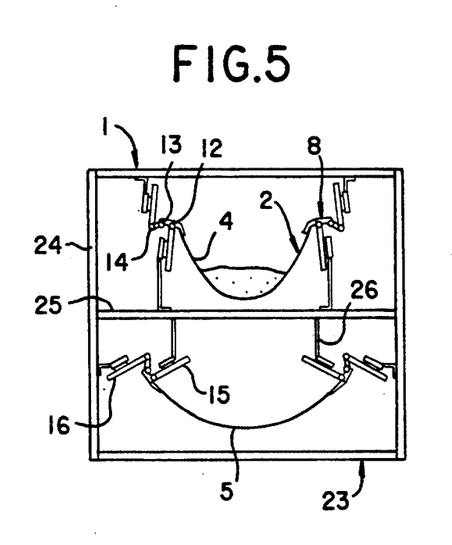
Figure 6:
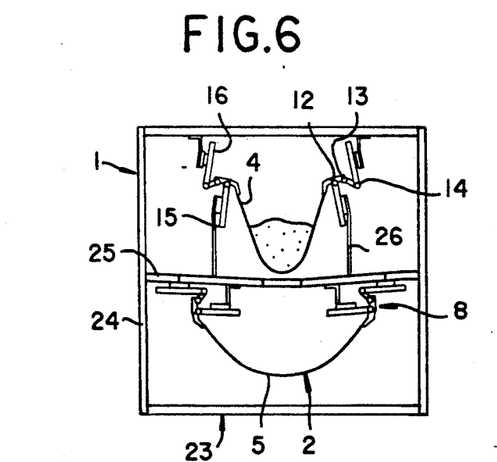
Figure 7:
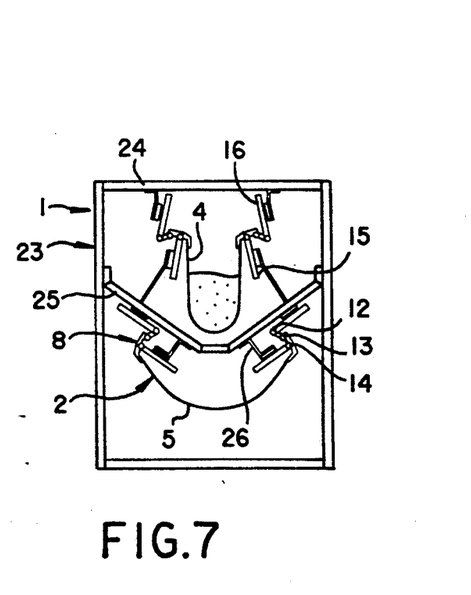

Referring particularly to FIGS. 2 and 3, it will be seen that the opposite longitudinal edges 6 and 7 of the endless band 2 are equipped with a multiplicity of catch elements, designated as a whole by the reference 8, which extend laterally and in projection and which are spaced uniformly.

Each catch element 8 comprises a part 9 fastened to the edge of the band 2 by a suitable point-fastening means and a part 10 mounted in an articulated manner on the part 9 by means of a pivot axle 11 which extends parallel to the edge of the band 2 in such a way that the articulated part 10 can pivot about the edge of the band 2.

On each side of the endless band 2, the conveyor 1 comprises three endless cables 12, 13 and 14, to which are fastened by a suitable point-fastening means the articulated parts 10 of the catch elements 8 associated with the longitudinal edges 6 and 7 of the band, these cables having substantially the same length as the band 2.

In the example, the endless cables 12, 13 and 14 are fastened to catch elements 8 at equal distances from one another, the cable 12 being nearest to the pivot axle 11 of the catch elements 8 and at a distance from this pivot axle, the cable 14 being furthest away and the cable 13 being between the cable 12 and the cable 14.

In the in-line parts 4 and 5 of the endless band 2, the paths of the cables 12 adjacent to the edges 6 and 7 of the endless band 2 are determined respectively by four series of supporting rollers 15, and the paths of the cables 14 furthest away from the edges 6 and 7 of the endless band 2 are determined respectively by four series of reaction rollers 16.

In the abovementioned four series of pulleys associated respectively with the four longitudinal edges of the upper and lower strands 4 and 5 of the endless band, the supporting pulleys 15 and reaction pulleys 16 are arranged in such a way that their axes are parallel and that they are arranged respectively on either side of the plane containing the endless cables 12, 13 and 14 and perpendicularly to this plane. Furthermore, the supporting pulleys 15 and reaction pulleys 16 are arranged so as to generate a lever effect making it possible to suspend the edges 6 and 7 of the endless band 2 in a cantilevered manner. Thus, the edges 6 and 7 of the endless band 2 are carried solely by means of the series of supporting pulleys 15 and series of reaction pulleys 16.

Referring to FIG. 3, it will be seen that the return members 3 possess, on each side of the endless band 2, return pulleys 17 and 18, over which the endless cables 12 and 13 pass respectively, these return pulleys 17 and 18 being mounted on the same axis and having the same diameter. The outer cable 14 could likewise pass over return pulleys.

Figure 8:
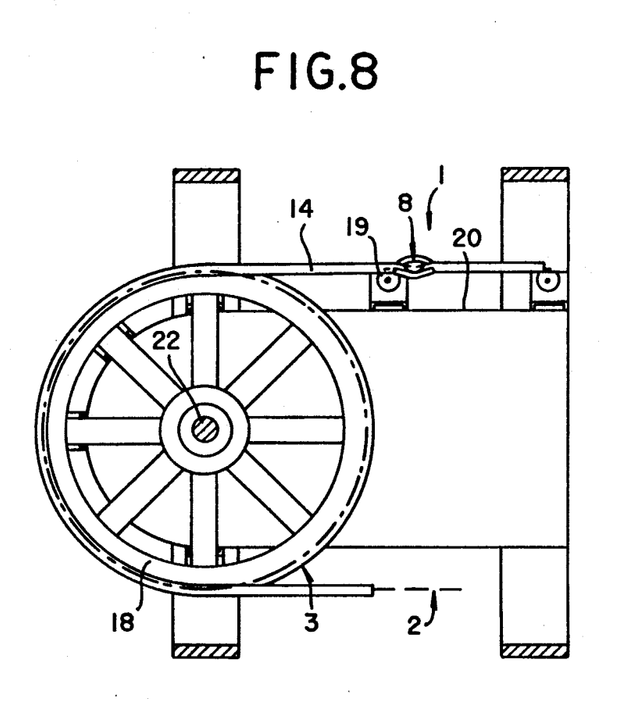
FIG. 8 shows a side view of one of the end parts of the conveyor.
Figure 9:
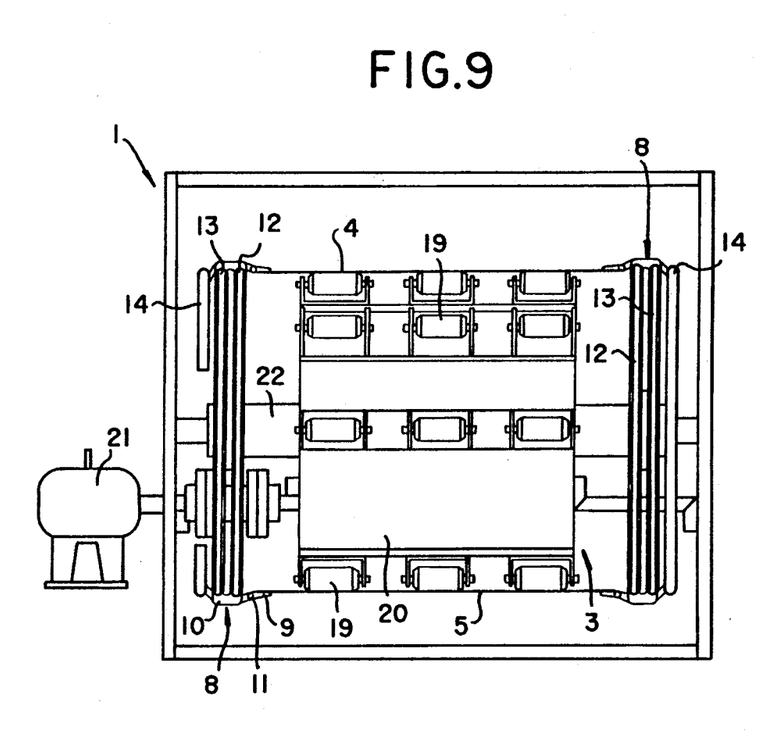
FIG. 9 shows an end view of the end of the conveyor according to FIG. 8.

Referring to FIGS. 8 and 9, it will be seen that the return members 3 comprise, furthermore, a multiplicity of rollers 19 which are mounted on the outer face of a U-shaped plate 20, the branches of which extend horizontally longitudinally relative to the endless band 2 and on which this endless band 2 bears so that the latter is guided and supported during its return. Thus, at the ends of the conveyor, the return pulleys 17 and 18 do not carry the band 2 and serve solely for the return of the lateral cables.

Moreover, for the purpose of driving the four return pulleys 17 and 18 of one of the ends of the conveyor in rotation, there is an electric motor 21 connected to the transverse shaft 22 carrying them.

Referring now to FIGS. 4 to 7, it will be seen that the respective arrangements of the abovementioned series of supporting pulleys 15 and reaction pulleys 16 make it possible to vary or modify the spacing between the edges 6 and 7 of the endless band 2.

In the example illustrated in these Figures, the conveyor 1 has a multiplicity of supports 23, each comprising a rectangular frame 24 which extends transversely relative to the endless band 2 and through which the two strands 4 and 5 of the latter pass, these frames 24 each possessing a crossmember 25 passing between the upper strand 4 and lower strand 5 of the endless band 2. Each frame 24 possesses, furthermore, lugs 26 which carry a supporting pulley 15 and a supporting pulley 16 associated with each of the edges of these strands 4 and 5, the axes of these pulleys extending in the plane of the frame 24.

In the example shown in FIGS. 1, 4 to 7, the supporting pulleys 15 and reaction pulleys 16 of the four abovementioned series of pulleys are mounted on the various supports 23 provided at different locations along the strands 4 and 5 of the endless band 2, in such a way that, starting from the return members 3 provided at the ends of the conveyor 1, the edges 6 and 7 of the endless band 2 come progressively closer to one another and that, over the entire longitudinal central part of the strands 4 and 5, the edges 6 and 7 of these are parallel.

Thus, over most of the length of the strands 4 and 5 of the endless band 2, these strands 4 and 5 are in the form of longitudinal gutters or pouches, the edges of which are suspended on the endless cables 12, 13 and 14 by means of the catch elements 8. In the example illustrated, the longitudinal edges 6 and 7 of the upper strand 4 of the endless band are closer to one another than the longitudinal edges of the lower strand 5.

Furthermore, it can be seen that the supporting pulleys 15 associated with the longitudinal edges 6 and 7 of the upper strand 4 of the endless band 2 are arranged underneath the endless cables 12, and that the reaction rollers 16 are arranged above the endless cables 14, the articulated parts 10 of the catch elements 8 extending outwards and the abovementioned pulleys being on the outside of the gutter formed by the upper strand 4 and inside the gutter formed by the lower stand 5.

Where the lower strand 5 of the endless band 2 is concerned, the supporting pulleys 15 and reaction pulleys 16 associated with the edges 6 and 7 of the lower strand 5 of the endless band 2 are in positions opposite to those described above.

It is expedient to note that, whatever the positions of the articulated parts 10 of the catch elements 8 determined by the series of supporting rollers 15 and reaction rollers 16 on which the cables 12 and 14 bear, the longitudinal edges 6 and 7 of the endless band 2 are suspended by means of an articulated connection consisting of the pivot axles 11 of the catch elements 8. Thus, the upper and lower strands 4 and 5 of the endless band 2 assume their forms of longitudinal gutters, without any torsional stresses on the edges of the endless band 2.

In general terms, the materials to be transported by the conveyor 1 are deposited onto one of the end parts of the upper strand 4 of the endless band 2 and are discharged by gravity at its other end, these materials being protected over the entire central part of this strand 4, in which it is in the form of a suspended gutter. However, since the relative positions of the longitudinal edges 6 and 7 of the upper strand 4 of the endless band 2 are determined by the series of supporting pulleys 15 and of reaction pulleys 16 on which the endless cables 12 and 14 bear which are determined by supports 23 and cross-bars 25, it is perfectly possible to move apart the edges of the endless band 2 at any locations over the length of the strand 4, in order to make it possible to deposit materials to be transported at these locations.

Figure 10:
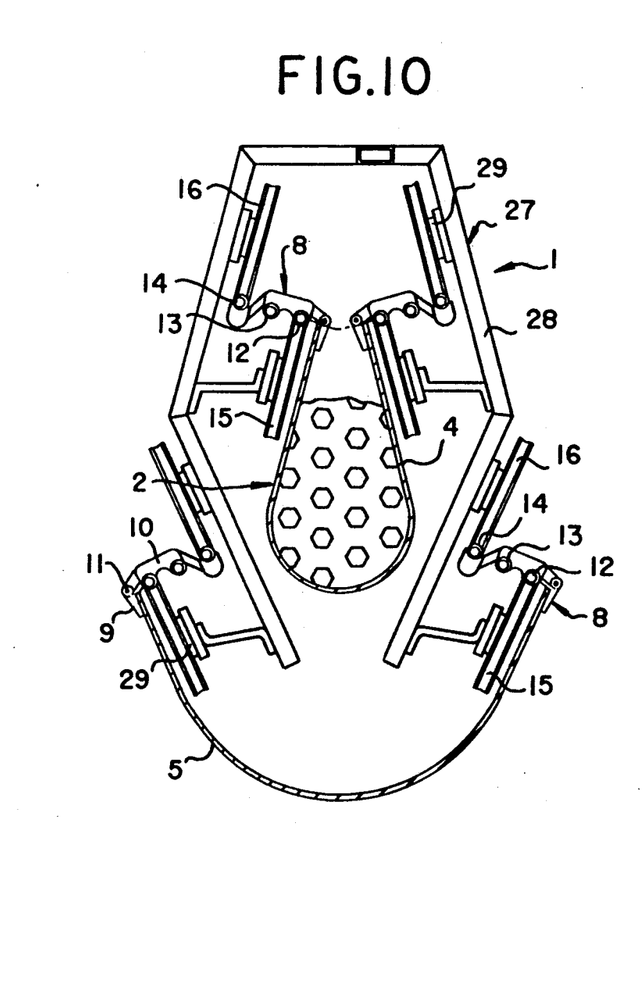
FIG. 10 shows a cross-section through the middle part of the conveyor with another supporting structure.
Figure 11:
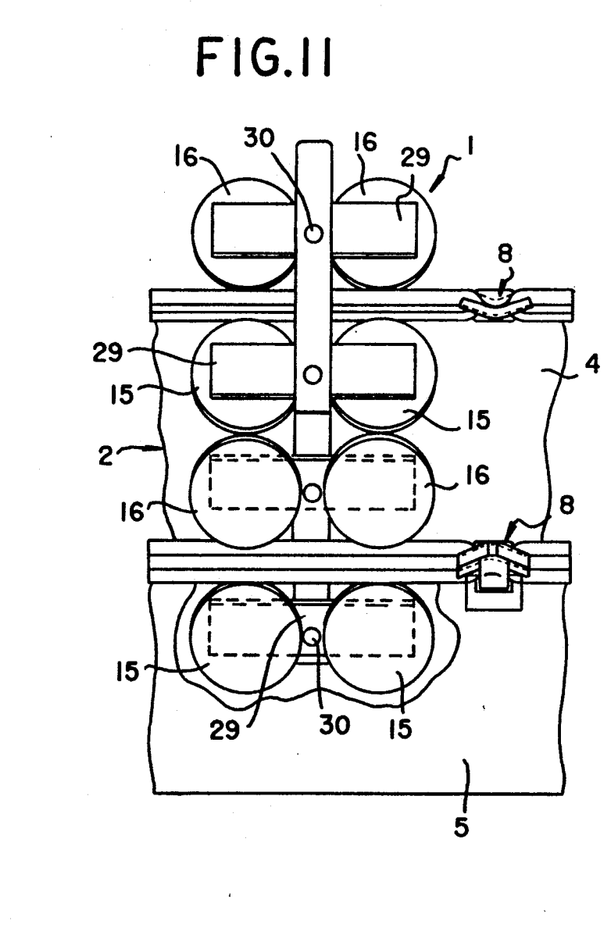
FIG. 11 shows a side view of FIG. 10.
Figure 12:
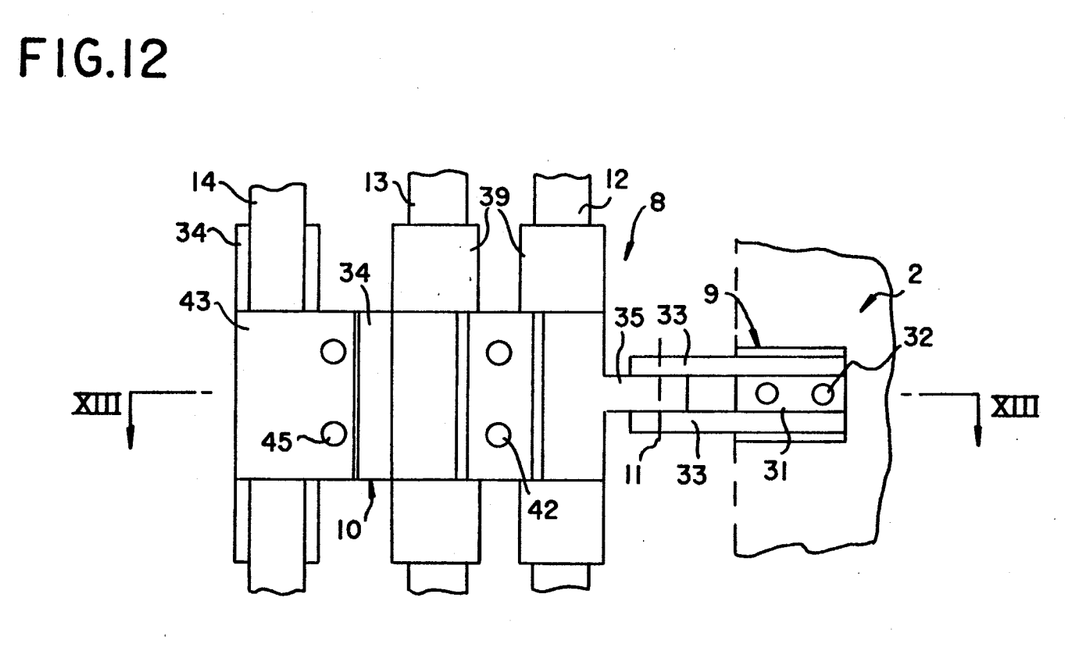
FIG. 12 shows a top view of a catch element of the endless band of the conveyor.

Referring now to FIGS. 10 and 11, it will be seen that they illustrate a support 27 which differs from the above-described support 23 in that it has a diamond-shaped frame 28, through which passes the upper strand 4 of the endless band 2, the lower strand 5 of this endless band 2 extending underneath the frame 28. The supporting pulleys 15 and reaction pulleys 16 associated respectively with the longitudinal edges of the upper and lower strands 4 and 5 of the endless band 2 are grouped in pairs mounted on rockers 29 which are articulated on the frame 28 by means of axles 30.

By referring to FIGS. 12 to 15, a structure of the catch element 8 making an articulated connection between the endless band 2 and the endless cables 12, 13 and 14 will now be described.

The part 9 of the catch elements 8 comprises a plate 31 placed flat on the edge of the endless band 2 and fastened to the latter, for example by means of rivets 32, only the axes of which are shown. This plate 31 carries two parallel arms 33 which extend outwards beyond the longitudinal edge of the endless band 2.

The part 10 of the catch elements 8 comprises a plate 34 which has a projecting tab 35 engaged between the arms 33 of the part 9, the pivot axle 11 parallel to the longitudinal edge of the endless band 2 connecting the tab 35 and the arms 33 so as to form a yoke.

In relation to the endless band 2, the plate 34 extends laterally outwards and possesses, on one of its surfaces, two longitudinal grooves 36 and 37 which are parallel to the pivot axle 11 and in which the endless cables 12 and 13 engage laterally and, on its other face, a longitudinal groove 38 which is likewise parallel to the pivot axle 11 and in which the endless cable 13 and 14 engages laterally.

To keep the two cables 12 and 13 in the grooves 36 and 37, the part 10 of the catch members 8 comprises a shoe 39 having two longitudinal grooves 40 and 41, into which the cables 12 and 13 are engaged laterally. This shoe 39 is fastened to the plate 34 by means of bolts 42, only the axes of which have been shown, these bolts being arranged between the cables 12 and 13 in the middle zone of the shoe 39.

To retain the endless cable 14, the part 10 of the catch members 8 comprises a shoe 43 having a longitudinal groove 44, in which the endless cable 14 is engaged laterally. This shoe 43 is fastened to the plate 34 by means of bolts 45, only the axes of which have been shown, these bolts 45 being arranged between the cables 13 and 14.

Figure 14:
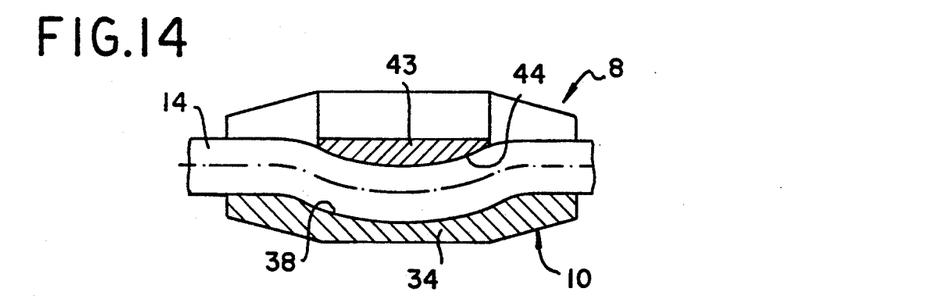
FIG. 14 shows a longitudinal section according to XIV—XIV of the catch element of FIG. 13.
Figure 15:
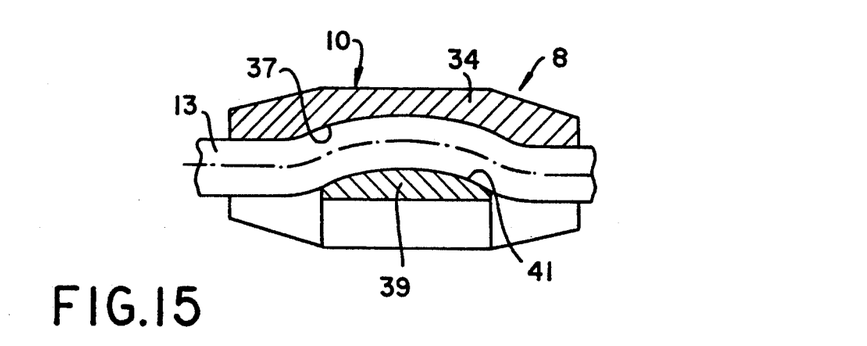
FIG. 15 shows a longitudinal section according to XV—XV of the catch element of FIG. 13.

As can be seen more specifically in FIGS. 14 and 15, the longitudinal grooves of the plate 34, the shoe 39 and the shoe 43 are shaped in such a way that the cables 12, 13 and 14 extend through the part 10 of the catch elements 8 to form a highly elongate omega.

Figure 13:
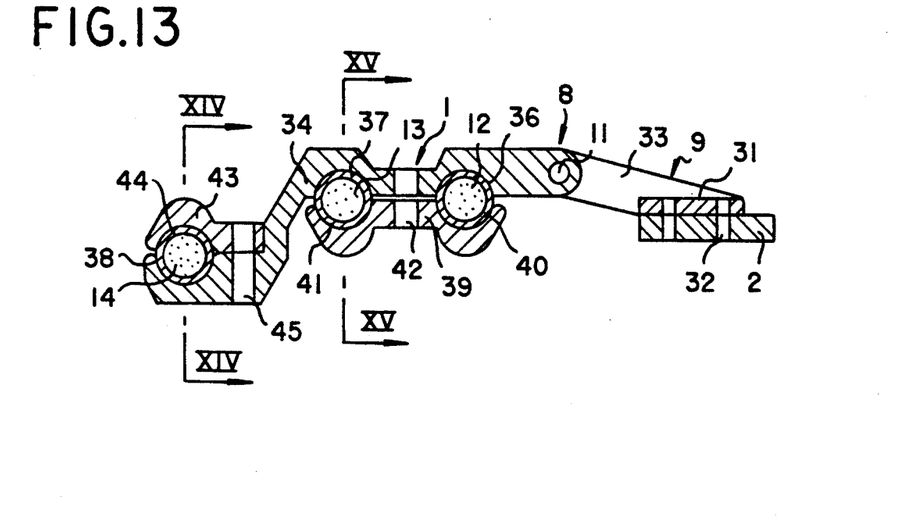
FIG. 13 shows a cross-section according to XIII—XIII of the catch element of FIG. 12.

As can be seen more specifically in FIG. 13, between the endless cables 13 and 14 the plate 34 is bent in the form of an S, in such a way that, in the example, the endless cables 12 and 13 on the one hand and the endless cable 14 on the other hand extend on either side of a plane, the pivot axle 11 being offset slightly towards the cables 12 and 13, and when the plate 31 is parallel to this plane the latter passes through the edge of the endless band 2.

Furthermore, the outer faces of the shoes 39 and 43 are shaped in such a way as to be capable of passing and being guided in the grooves of the abovementioned pulleys over which the endless cables 12, 13 and 14 travel.

The present invention is not limited to the example described above. Many alternative embodiments are possible, without departing from the scope defined by the accompanying claims.

We claim:

1. Endless band conveyor, the longitudinal edges (6,7) of which are equipped with projecting articulated catch elements (8) spaced in the longitudinal direction of the band, wherein each of said catch elements comprises a first part (9) fastened to an edge of an endless band (2) and pivoted at a free end thereof to a second part (10) which is provided with cooperating grooves (36, 38, 40, 44) for sliding reception therein of at least two spaced apart endless cables, and wherein, on each of the sides of the endless band and over at least some of its length, the path of said cables is determined by supporting pulleys (15) and reaction pulleys (16), on which said cables bear respectively, generating a lever effect, thus making it possible to suspend the edges of the endless band.

2. Endless band conveyor, the edges of which are equipped with endless cables, wherein each longitudinal edge of an endless band (2) is fixed to at least two spaced apart endless cables (12,14), and, on each of the sides of the endless band and over at least some part of its length, the path of the cables is determined by supporting pulleys (15) and reaction pulleys (16), on which said cables bear respectively, generating a lever effect, making it possible to suspend the edges (6,7) of the endless band, and wherein the positions of the supporting pulleys and reaction pulleys are determined by supports (23) on which the pulleys are mounted at different locations along the strands (4,5) of the endless band in such a way that the edges (6,7) of the endless band come progressively closer and in parallel relation to one another.

3. Conveyor according to claim 2, characterised in that each longitudinal edge of the endless band (2) is likewise fixed to a third endless cable (13).

4. Conveyor according to one of claims 2 or 3, characterized in that each longitudinal edge of the endless band (2) is fixed to the endless cables associated with it by means of projecting catch elements (8) spaced in the longitudinal direction of this band.

5. Conveyor according to claim 4, characterized in that each catch element (8) comprises two parts (9, 10) which are articulated on one another in the longitudinal direction of the band and of which one is fastened to the longitudinal edge of the band and the other is fastened to the associated endless cables.

6. Conveyor according to claim 1, 2, 3 or 5, characterised in that it comprises supports (23), each carrying at least one supporting pulley (15) and at least one reaction pulley (16) which are associated with a longitudinal edge of the endless band.

7. Conveyor according to claim 6, characterised in that the supporting pulley (15) and reaction pulley (16) are of parallel axes and are located on either side of the cables (12, 14).

8. Conveyor according to claim 1, 2, 3, 5 or 7, characterised in that the said supporting pulleys (15) and reaction pulleys (16) are arranged in such a way that, over at least some of the length of the upper strand and/or of the lower strand of the endless band (2), the longitudinal edges (6, 7) of the latter are close to one another.

9. Conveyor according to claim 8, characterised in that, at its ends, it possesses pulleys (17, 18) for the return of the said cables.

10. Conveyor according to claim 9, characterised in that, at its ends, it possesses return members (19) on which the endless band (2) bears.

11. Conveyor according to claim 10, characterized in that said return members on which the endless bands bears consists of a multiplicity of rollers (19).

12. Endless band conveyor, the longitudinal edges (6,7) of which are equipped with projecting articulated catch elements (8) spaced in the longitudinal direction of the band, wherein each of said catch elements comprises a first part having one end thereof fastened to an edge of an endless band and the other end thereof pivoted to a second part adapted for sliding reception of at least two spaced apart endless cables, and in that, on each of the sides of the endless band and over at least some of its length, the path of said endless cables is determined by supporting pulleys (15) and reaction pulleys (16), on which said cables bear respectively, generating a lever effect, making it possible to suspend the edges of the endless band, and wherein the positions of the supporting pulleys and reaction pulleys are determined by supports (23) on which the pulleys are mounted at different locations along the strands (4,5) of the endless band in such a way that the edges (6,7) of the endless band come progressively closer and in parallel relation to one another.

13. Endless band conveyor, the edges of which are equipped with endless cables, wherein each longitudinal edge of an endless band (2) is fixed to at least two spaced apart endless cables (12, 14) through catch elements (8) spaced in the longitudinal direction of the band, and, on each of the sides of the endless band and over at least some part of the length, the path of the cables the cables is determined by supporting pulleys (15) and reaction pulleys (16), on which said cables bear respectively, generating a lever effect, making it possible to suspend the edges (6, 7) of the endless band, and comprising return means having, on the same axis, central return members supporting the endless band and lateral return pulleys (16, 17) on which the cables pass respectively.

* * * * *